United States Patent
Chen

(10) Patent No.: US 9,995,952 B2
(45) Date of Patent: Jun. 12, 2018

(54) DRIVING METHOD OF LIQUID CRYSTAL DISPLAY PANEL

(71) Applicant: Shenzhen China Star Optoelectronics Technology Co., Ltd., Shenzhen (CN)

(72) Inventor: Lixuan Chen, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 248 days.

(21) Appl. No.: 15/031,751

(22) PCT Filed: Feb. 26, 2016

(86) PCT No.: PCT/CN2016/074620
§ 371 (c)(1),
(2) Date: Apr. 25, 2016

(87) PCT Pub. No.: WO2017/133042
PCT Pub. Date: Aug. 10, 2017

(65) Prior Publication Data
US 2018/0059458 A1 Mar. 1, 2018

(30) Foreign Application Priority Data
Feb. 1, 2016 (CN) .......................... 2016 1 0071586

(51) Int. Cl.
*G02F 1/133* (2006.01)
*G02F 1/1333* (2006.01)
*G02F 1/1343* (2006.01)

(52) U.S. Cl.
CPC .... *G02F 1/13306* (2013.01); *G02F 1/133308* (2013.01); *G02F 1/134309* (2013.01);
(Continued)

(58) Field of Classification Search
CPC .......... G02F 1/13306; G02F 1/133308; G02F 1/134309; G02F 2001/134345; G02F 2201/123
See application file for complete search history.

(56) References Cited

U.S. PATENT DOCUMENTS 9,864,228 B2 * 1/2018 Hsu .................... G02F 1/133514
2011/0267325 A1 * 11/2011 Xi ......................... G09G 3/3648
345/211

(Continued)

FOREIGN PATENT DOCUMENTS

| CN | 104021751 A | 9/2014 |
|----|-------------|--------|
| CN | 104460077 A | 3/2015 |

*Primary Examiner* — Afroza Chowdhury
(74) *Attorney, Agent, or Firm* — Leong C. Lei

(57) ABSTRACT

Disclosed is a driving method of a liquid crystal display panel. Area division is implemented to obtain at least three division areas for individually providing a compensation signal voltage to each division area according to the difference of the actual brightnesses and the target brightnesses, and with the compensation signal voltage, implementing enhancement to a data signal voltage corresponded with a sub pixel, of which a difference of the data signal voltage (V+) in a positive polarity driving cycle or the data signal voltage (V−) in a negative polarity driving cycle and the common voltage (VCOM) is smaller, and implementing abatement to a data signal voltage corresponded with a sub pixel, of which a difference of the data signal voltage (V+) in the positive polarity driving cycle or the data signal voltage (V−) in the negative polarity driving cycle and the common voltage (VCOM) is larger.

12 Claims, 8 Drawing Sheets

(52) U.S. Cl.
CPC ............ *G02F 2001/134345* (2013.01); *G02F 2201/123* (2013.01)

(56) References Cited

U.S. PATENT DOCUMENTS

2012/0147065 A1* 6/2012 Byun .................... G09G 3/3208
345/690
2016/0351151 A1* 12/2016 Cao ........................ H01L 27/124

* cited by examiner

DRIVING METHOD OF LIQUID CRYSTAL DISPLAY PANEL

FIELD OF THE INVENTION

The present invention relates to a display technology field, and more particularly to a driving method of a liquid crystal display panel.

BACKGROUND OF THE INVENTION

The Liquid Crystal Display (LCD) is one of the most widely utilized flat panel displays, and the liquid crystal display panel is the core component of the Liquid Crystal Display. The liquid crystal display panel generally comprises a Thin Film Transistor Array Substrate (TFT Array Substrate), a Color Filter (CF) and a Liquid Crystal Layer arranged between the two substrates. In general, the array substrate and the color filter substrate comprise pixel electrodes and common electrodes. As the voltages are applied to the pixel electrodes and the common electrodes, the electrical field can be generated in the liquid crystal layer to twist the liquid crystal molecules in the liquid crystal layer, and then to adjust the polarization of the light incident into the liquid crystal layer for making the liquid crystal display panel show images.

The Vertical Alignment (VA) liquid crystal display panel possesses extremely high contrast than the liquid crystal displays of other types. It has very wide application in large scale display, such as television or etc. The pixel electrode inside the VA type liquid crystal display panel is generally designed to be a pozidriv structure: the vertical trunk and the horizontal trunk of the pixel electrode are perpendicular to equally split the area of the pixel electrode into 4 domains, and each region is composed with spread strip branches appearing ±45°, ±135° angles with the vertical trunk or the horizontal trunk. In such pozidriv pixel electrode structure, because the included angles of the slit with the vertical trunk and the horizontal trunk in each pixel electrode domain are the same, a certain visual color difference or visual color deviation must exist at large view angle.

At present, for improving the large view angle color washout phenomenon of the VA type liquid crystal display panel, the Low Color Shift (LCS) design is executed to the pixel units, which is to divide each sub pixel into a main region and a sub region. One independent main region pixel electrode is positioned in the main region, and one independent sub region pixel electrode is positioned in the sub region. Both the main region pixel electrode and the sub region pixel electrode utilize the pozidriv structure design. In the display process, the same data signal voltage is applied to the main region pixel electrode in the main region and the sub region pixel electrode in the sub region, and then, the voltage of the sub region pixel electrode is pulled down so that the voltage level of the sub region pixel electrode is lower than the voltage level of the main region pixel electrode. Such solution makes the twist angles of the liquid crystal molecules in the main region and in the sub region are different, and thus to improve the large view angle color washout phenomenon of the VA type liquid crystal display panel.

However, after utilizing the aforesaid LCS design to the pixel unit, the region between the main region and the sub region of the sub pixel are opaque, and the aperture ratio and the transmission rate of the liquid crystal display panel are decreased.

For reducing the impact to the transmission rate while improving the large view angle color washout, a design solution of the pixel unit structure is proposed, which includes a red sub pixel, a green sub pixel and a blue sub pixel, the sub pixels of three various colors, wherein the green sub pixel with the highest transmission rate is an integrated structure without the main region, sub region division for raising the entire transmission rate of the liquid crystal display panel, and at least one of the red sub pixel and the blue sub pixel is divided into a main region and a sub region for improving the large view angle color washout.

However, it is discovered in the practical display experiment, the aforesaid pixel unit structure remains having issues. The actual electrical properties of the red or blue sub pixel divided into the main region and the sub region have inconsistent situations with the influence of the liquid crystal display panel design, the feed-through voltage in the panel and the other capacitor coupling. Under the circumstance that the common voltage are the same and the inputted data signal voltages are the same in the liquid crystal display panel, because the red or blue sub pixel is divided into two parts, the actual data signal voltages of the red or blue sub pixel divided into the main region and the sub region are different from the actual data signal voltage of the green sub pixel having the integrated structure. Along the different areas along the horizontal direction in the panel, the common voltage actually is not at the symmetric center position of the data signal voltage in the positive polarity driving cycle and the data signal voltage in the negative polarity driving cycle of the red or blue sub pixel. Thus, it results in showing the different effects. The brightness of the red or blue sub pixel drifts, and significantly influences the color uniformity of the entire liquid crystal display panel in the gray scale image.

FIG. 1 shows an illustration of the aforesaid pixel unit structure. Both the green sub pixel 20 and the red sub pixel 10 utilize the integrated structures, and only the blue sub pixel 30 is divided into a main region 301 and a sub region 302. FIG. 2 is a relationship diagram of an actual data signal voltage and a common voltage VCOM in the left, middle and right, three different areas of the liquid crystal display panel as regarding the illustration of FIG. 1. The V+ represents the data signal voltage in the positive polarity driving cycle, and the V− represents the data signal voltage in the negative polarity driving cycle, and the common voltage VCOM of different areas are the same values. The fine dotted line represents the data signal voltage of the green sub pixel, and the thick dotted line represents the data signal voltage of the blue sub pixel. Accordingly, the blue sub pixels have color deviation at the left side, the right side of the panel, and the bad conditions of blue deviation in the left, the green deviation in the right and the more obvious flicker happen.

Most liquid crystal display panel according to prior art do not utilize the design that various common voltages VCOM are set for the various regions of the panel. Therefore, for the sub pixels divided into the main region and the sub region, such as the blue sub pixels, the common voltage VCOM always has asymmetry.

SUMMARY OF THE INVENTION

An objective of the present invention is to provide a driving method of a liquid crystal display panel, which can solve the nonuniform color and flicker issues of the different areas of the panel due to that the red or blue sub pixels are divided into the main region and the sub region to make the color of the entire liquid crystal display panel to be uniform as showing the gray scale images.

For realizing the aforesaid objective, the present invention provides a driving method of a liquid crystal display panel, comprising steps of:

step 1, providing a liquid crystal display panel;

the liquid crystal display panel comprises a plurality of pixel units aligned in array, and each pixel unit comprises a red sub pixel unit, a green sub pixel unit and a blue sub pixel unit; the green sub pixel is an integrated structure, and at least one of the red sub pixel unit and the blue sub pixel unit is divided into two parts, a main region and a sub region;

step 2, implementing area division to the liquid crystal display panel to obtain at least three division areas;

step 3, activating the liquid crystal display panel to provide theoretical data signal voltages and the same common voltage to the respective division areas of the liquid crystal display panel to compare differences of actual brightnesses of the respective division areas and target brightnesses under the theoretical data signal voltages;

step 4, individually providing a compensation signal voltage to each division area according to the difference of the actual brightnesses and the target brightnesses of the respective division areas of the liquid crystal display panel, and in each division area of the liquid crystal display panel, with the compensation signal voltage, implementing enhancement to a data signal voltage corresponded with a sub pixel, of which a difference of the data signal voltage in a positive polarity driving cycle or the data signal voltage in a negative polarity driving cycle and the common voltage is smaller, and implementing abatement to a data signal voltage corresponded with a sub pixel, of which a difference of the data signal voltage in the positive polarity driving cycle or the data signal voltage in the negative polarity driving cycle and the common voltage is larger.

Selectably, in the step 1, only the blue sub pixel unit is divided into the two parts, the main region and the sub region.

Selectably, in the step 1, only the red sub pixel unit is divided into the two parts, the main region and the sub region.

Selectably, in the step 1, the blue sub pixel unit is divided into the two parts, the main region and the sub region, and the red sub pixel unit is also divided into the two parts, the main region and the sub region.

In the step 2, according to a position corresponded with a source drive IC in the liquid crystal display panel, the area division is implemented to the liquid crystal display panel to obtain at least three division areas.

In the step 2, the area division is implemented to the liquid crystal display panel along a horizontal direction to obtain at least three division areas.

The step 2 further comprises separately selecting one reference sub pixel in each division area, and in the step 3, comparing differences of actual brightnesses of the reference sub pixels in the respective division areas and the target brightnesses under the theoretical data signal voltages to compare the differences of the actual brightnesses of the respective division areas and the target brightnesses under the theoretical data signal voltages.

A distance a between the reference sub pixel and a left frame or a right frame of the liquid crystal display panel is: $0.1 \times L < a < 0.4 \times L$, and L is a width of the liquid crystal display panel; a distance b between the reference sub pixel and a top frame or a bottom frame of the liquid crystal display panel is: $0.2 \times H < b < 0.7 \times H$, and H is a height of the liquid crystal display panel.

The sub pixel of the integrated structure comprises an integrated pixel electrode of a pozidriv structure; in the sub pixel divided with the two parts, the main region and the sub region, wherein the main region comprises a main region pixel electrode of a pozidriv structure, and the sub region comprises a sub region pixel electrode of a pozidriv structure.

The present invention further provides a driving method of a liquid crystal display panel, comprising steps of:

step 1, providing a liquid crystal display panel;

the liquid crystal display panel comprises a plurality of pixel units aligned in array, and each pixel unit comprises a red sub pixel unit, a green sub pixel unit and a blue sub pixel unit;

the green sub pixel is an integrated structure, and at least one of the red sub pixel unit and the blue sub pixel unit is divided into two parts, a main region and a sub region;

step 2, implementing area division to the liquid crystal display panel to obtain at least three division areas;

step 3, activating the liquid crystal display panel to provide theoretical data signal voltages and the same common voltage to the respective division areas of the liquid crystal display panel to compare differences of actual brightnesses of the respective division areas and target brightnesses under the theoretical data signal voltages;

step 4, individually providing a compensation signal voltage to each division area according to the difference of the actual brightnesses and the target brightnesses of the respective division areas of the liquid crystal display panel, and in each division area of the liquid crystal display panel, with the compensation signal voltage, implementing enhancement to a data signal voltage corresponded with a sub pixel, of which a difference of the data signal voltage in a positive polarity driving cycle or the data signal voltage in a negative polarity driving cycle and the common voltage is smaller, and implementing abatement to a data signal voltage corresponded with a sub pixel, of which a difference of the data signal voltage in the positive polarity driving cycle or the data signal voltage in the negative polarity driving cycle and the common voltage is larger;

wherein in the step 1, only the blue sub pixel unit is divided into the two parts, the main region and the sub region;

wherein in the step 2, the area division is implemented to the liquid crystal display panel along a horizontal direction to obtain at least three division areas;

wherein the sub pixel of the integrated structure comprises an integrated pixel electrode of a pozidriv structure; in the sub pixel divided with the two parts, the main region and the sub region, wherein the main region comprises a main region pixel electrode of a pozidriv structure, and the sub region comprises a sub region pixel electrode of a pozidriv structure.

The benefits of the present invention are: the present invention provides a driving method of a liquid crystal display panel, and area division is implemented to the liquid crystal display panel to obtain at least three division areas for individually providing a compensation signal voltage to each division area according to the difference of the actual brightnesses and the target brightnesses of the respective division areas of the liquid crystal display panel, and in each division area of the liquid crystal display panel, with the compensation signal voltage, implementing enhancement to a data signal voltage corresponded with a sub pixel, of which a difference of the data signal voltage in a positive polarity driving cycle or the data signal voltage in a negative polarity driving cycle and the common voltage is smaller, and implementing abatement to a data signal voltage corresponded with a sub pixel, of which a difference of the data signal voltage in the positive polarity driving cycle or the data signal voltage in the negative polarity driving cycle and the common voltage is larger. The nonuniform color and flicker issues of the different areas of the panel due to that the red or blue sub pixels are divided into the main region and the sub region can be solved to make the color of the entire liquid crystal display panel to be uniform as showing the gray scale images.

BRIEF DESCRIPTION OF THE DRAWINGS

In order to better understand the characteristics and technical aspect of the invention, please refer to the following detailed description of the present invention is concerned with the diagrams, however, provide reference to the accompanying drawings and description only and is not intended to be limiting of the invention.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 1:
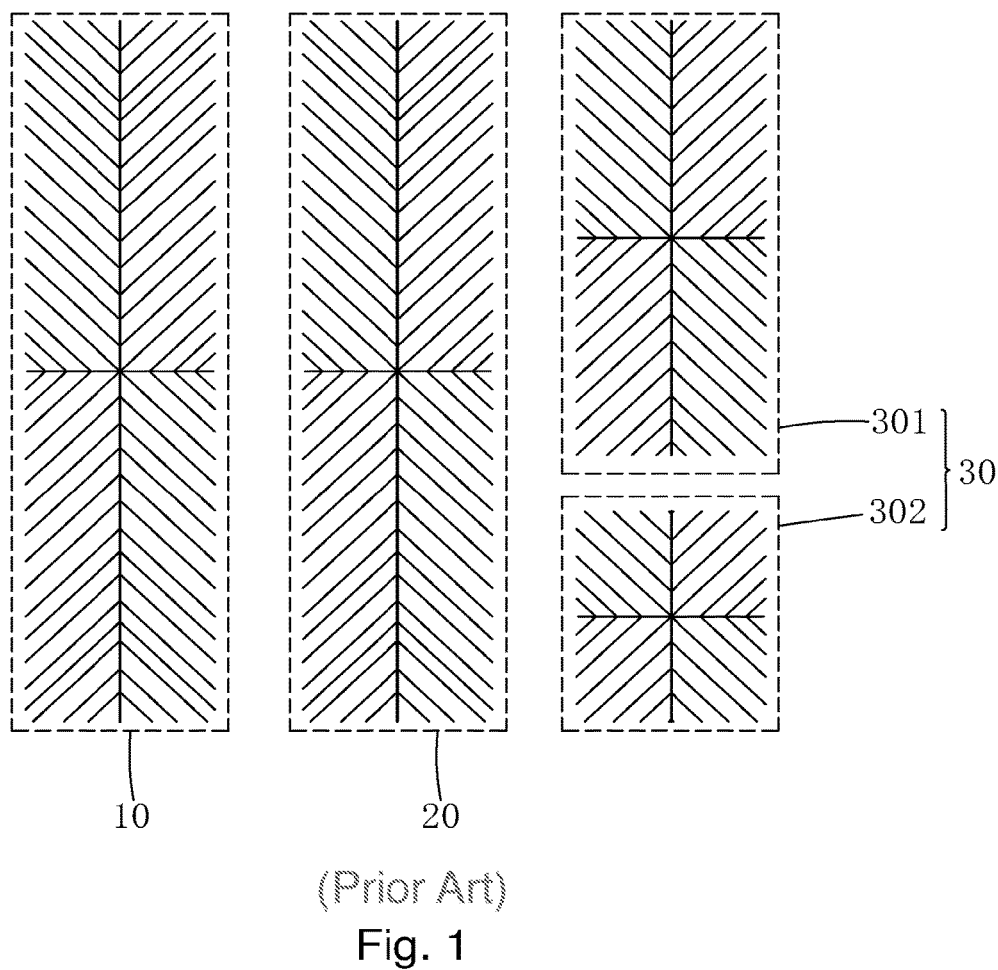
FIG. 1 is an illustration diagram of a liquid crystal display pixel unit structure according to prior art.
Figure 2:
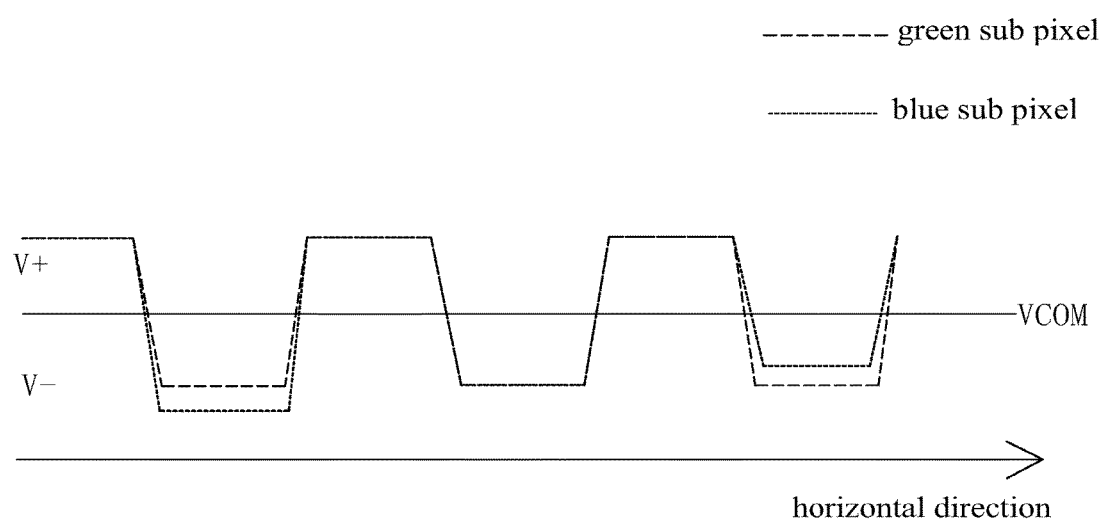
FIG. 2 is a relationship diagram of an actual data signal voltage and a common voltage VCOM in the left, middle and right, three different areas of the liquid crystal display panel as regarding the illustration of FIG. 1.
Figure 3:
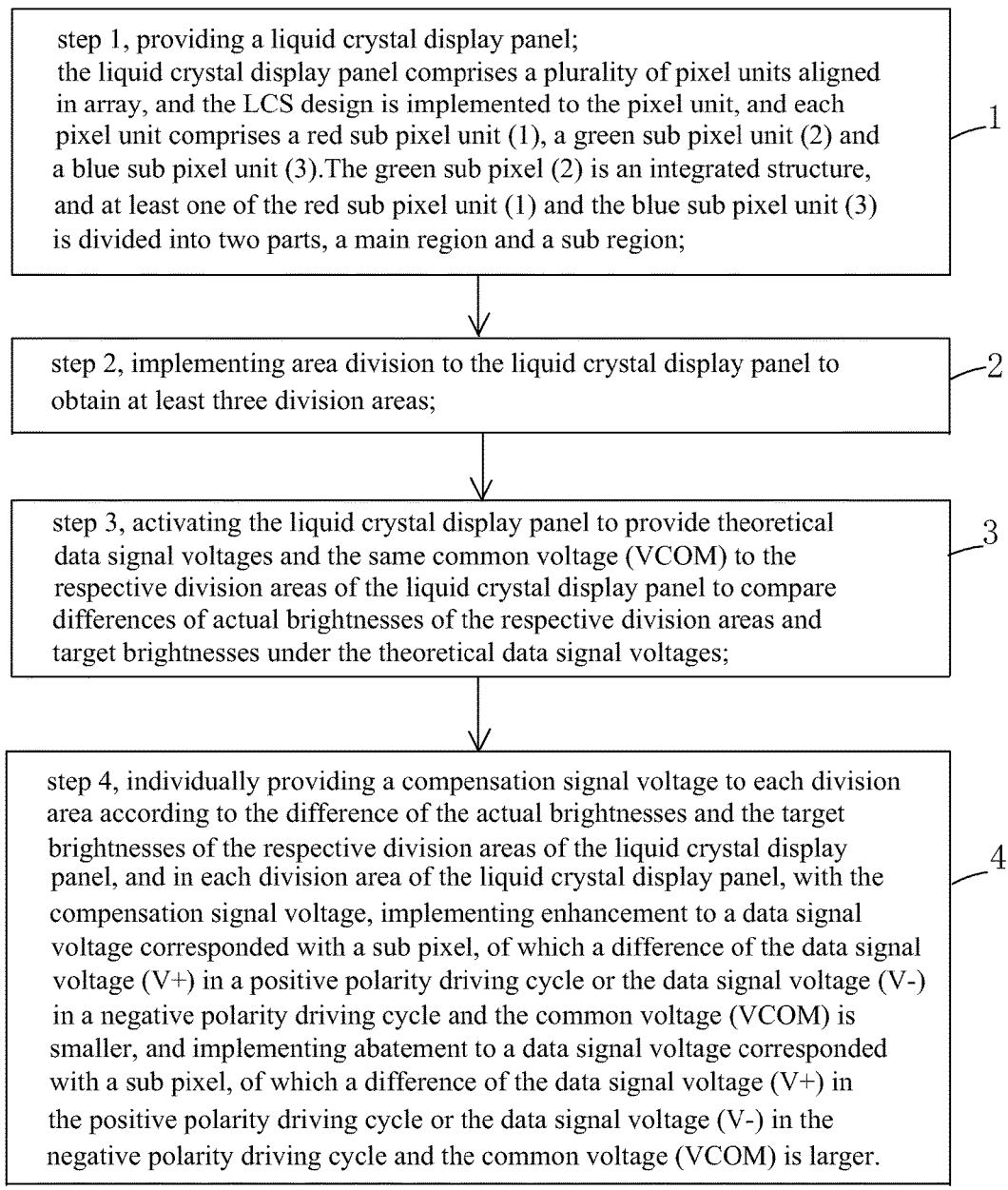
FIG. 3 is a flowchart of a driving method of a liquid crystal display panel according to the present invention.

Please refer to FIG. 3, the present invention provides a driving method of a liquid crystal display panel, comprising steps of:

step 1, providing a liquid crystal display panel.

Figure 4:
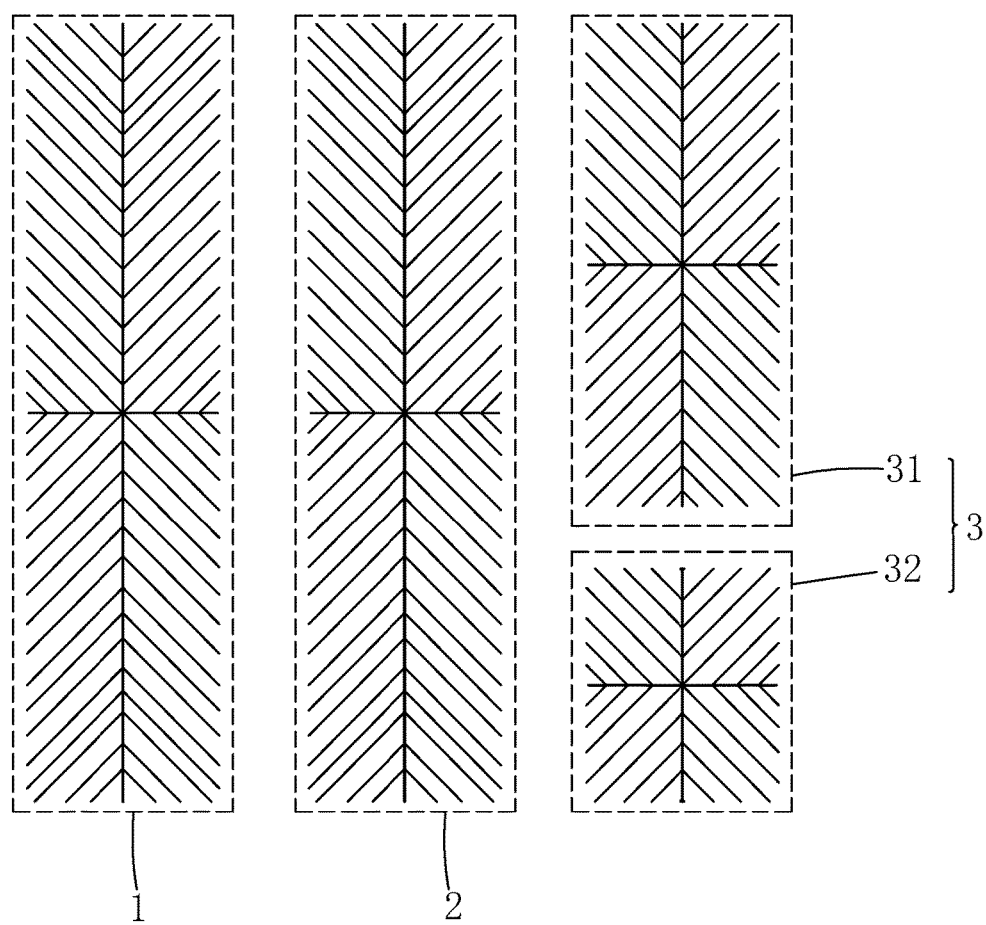
FIG. 4 is a diagram of a first structure of a pixel unit of the liquid crystal display panel in the driving method of the liquid crystal display panel according to the present invention.
Figure 5:
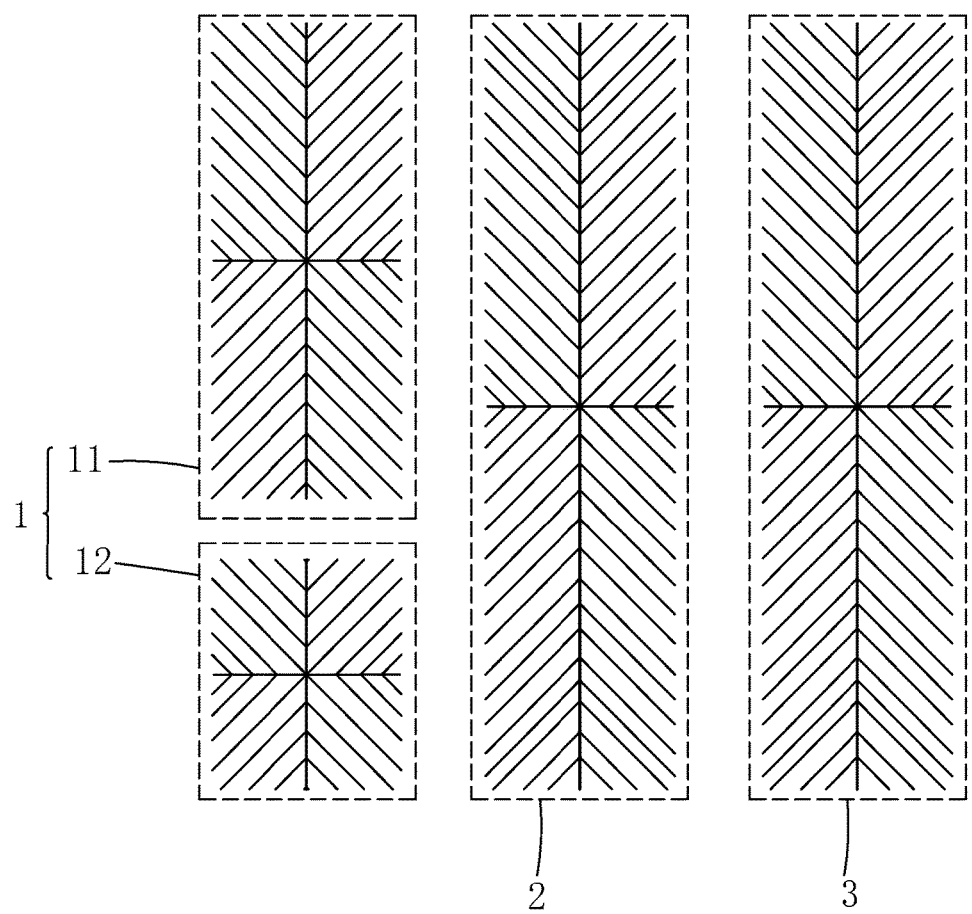
FIG. 5 is a diagram of a second structure of a pixel unit of the liquid crystal display panel in the driving method of the liquid crystal display panel according to the present invention.
Figure 6:
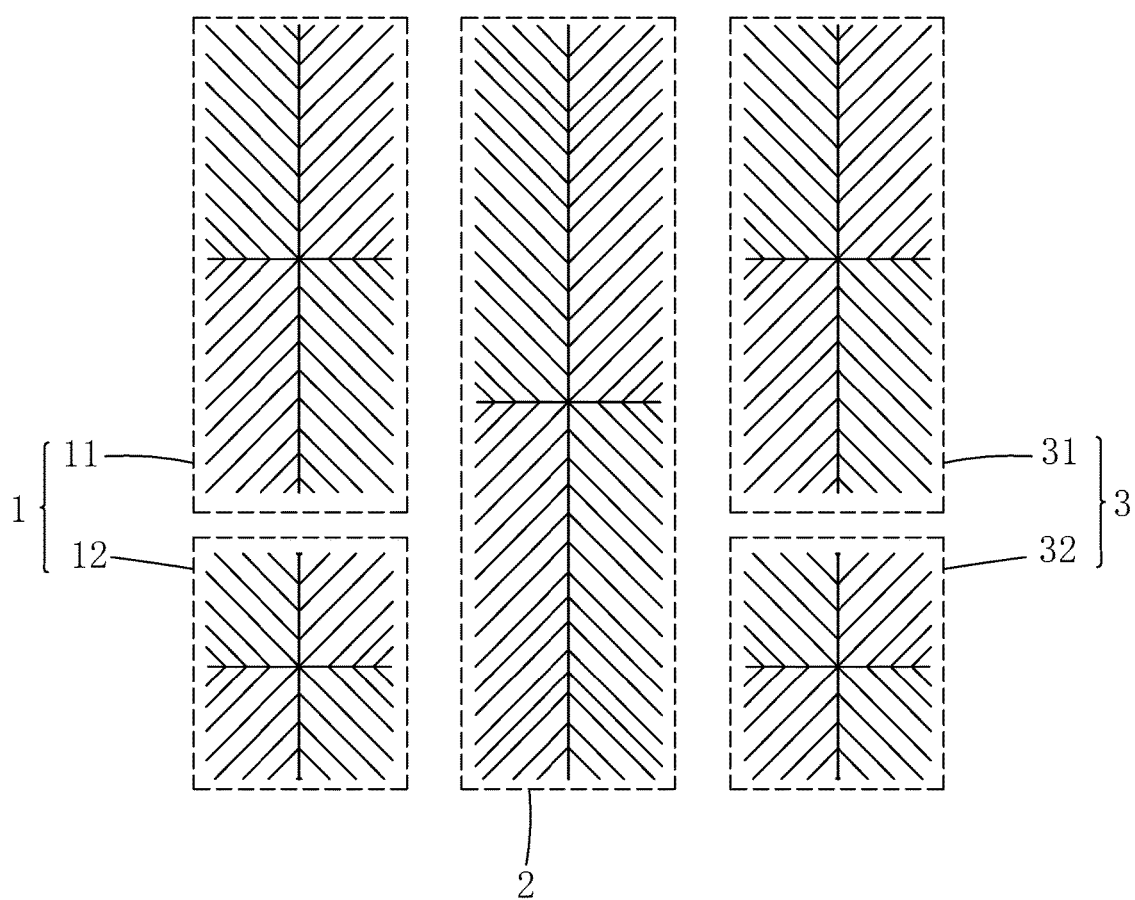
FIG. 6 is a diagram of a third structure of a pixel unit of the liquid crystal display panel in the driving method of the liquid crystal display panel according to the present invention.

The liquid crystal display panel comprises a plurality of pixel units aligned in array, and the LCS design is implemented to the pixel unit, and as shown in FIG. 4 to FIG. 6, each pixel unit comprises a red sub pixel unit 1, a green sub pixel unit 2 and a blue sub pixel unit 3. The green sub pixel 2 is an integrated structure, and at least one of the red sub pixel unit 1 and the blue sub pixel unit 3 is divided into two parts, a main region and a sub region.

Selectably, as shown in FIG. 4, for each pixel unit, only the blue sub pixel unit 3 is divided into the two parts, the main region 31 and the sub region 32, and the main region 31 comprises a main region pixel electrode of a pozidriv structure, and the sub region 32 comprises a sub region pixel electrode of a pozidriv structure; both the green sub pixel unit 2 and the red sub pixel unit 1 are integrated structures, and both the green sub pixel unit 2 and the red sub pixel unit 1 comprise integrated pixel electrodes of a pozidriv structure.

Selectably, as shown in FIG. 5, for each pixel unit, only the red sub pixel unit 1 is divided into the two parts, the main region 11 and the sub region 12, and the main region 11 comprises a main region pixel electrode of a pozidriv structure, and the sub region 12 comprises a sub region pixel electrode of a pozidriv structure; both the green sub pixel unit 2 and the blue sub pixel unit 3 are integrated structures, and both the green sub pixel unit 2 and the blue sub pixel unit 3 comprise integrated pixel electrodes of a pozidriv structure.

Selectably, as shown in FIG. 6, the blue sub pixel unit 3 is divided into the two parts, the main region 31 and the sub region 32, and the main region 31 comprises a main region pixel electrode of a pozidriv structure, and the sub region 32 comprises a sub region pixel electrode of a pozidriv structure; the red sub pixel unit 1 is divided into the two parts, the main region 11 and the sub region 12, and the main region 11 comprises a main region pixel electrode of a pozidriv structure, and the sub region 12 comprises a sub region pixel electrode of a pozidriv structure; the green sub pixel unit 2 is an integrated structure, and the green sub pixel unit 2 comprise an integrated pixel electrodes of a pozidriv structure.

Specifically, the pozidriv structure means that the vertical trunk and the horizontal trunk of the pixel electrode are perpendicular to equally split the area of the pixel electrode into 4 domains, and each region is composed with spread slits appearing ±45°, ±135° angles with the vertical trunk or the horizontal trunk.

As described in the background, as such pixel unit structure that the green sub pixel unit 2 is an integrated structure, and at least one of the red sub pixel unit 1 and the blue sub pixel unit 3 is divided into the two parts, the main region and the sub region can improve the large view angle color washout to raise the transmission rate, it also results in that the sub pixels divided into the two parts, the main region and the sub region has bad conditions of color deviation and obvious flicker at the left side, right side of the panel.

step 2, implementing area division to the liquid crystal display panel to obtain at least three division areas.

Specifically, in the step 2, according to a position corresponded with a source drive IC in the liquid crystal display panel, the area division is implemented to the liquid crystal display panel to obtain at least three division areas. For example, one source drive IC corresponds to the sub pixels of a certain column number in the liquid crystal display panel, and then, the sub pixels of the certain column number is divided to be one division area.

Figure 7:
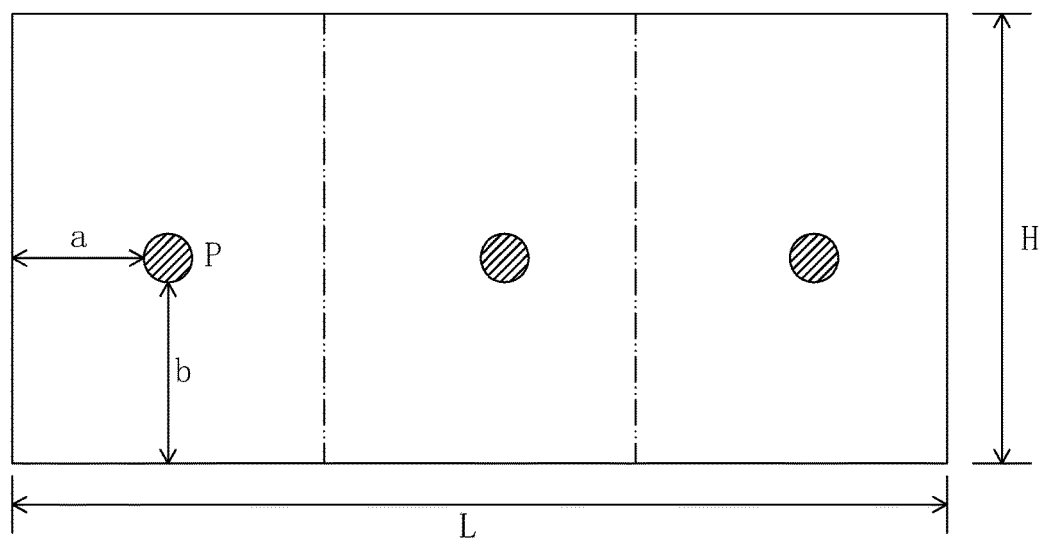
FIG. 7 is a diagram of the liquid crystal display panel implemented with the area division along a horizontal direction in the driving method of the liquid crystal display panel according to the present invention.

In the step 2, the area division also can be implemented to the liquid crystal display panel along a horizontal direction as shown in FIG. 7 to obtain at least three division areas. In such simple division, the step 2 further comprises separately selecting one reference sub pixel P in each division area, and moreover, a distance a between the reference sub pixel P and a left frame or a right frame of the liquid crystal display panel is: 0.1×L<a<0.4×L, and L is a width of the liquid crystal display panel; a distance b between the reference sub pixel P and a top frame or a bottom frame of the liquid crystal display panel is: 0.2×H<b<0.7×H, and H is a height of the liquid crystal display panel.

step 3, activating the liquid crystal display panel to provide theoretical data signal voltages and the same common voltage VCOM to the respective division areas of the liquid crystal display panel to compare differences of actual brightnesses of the respective division areas and target brightnesses under the theoretical data signal voltages.

Particularly, for the area division implemented to the liquid crystal display panel along a horizontal direction, in the step 3, comparing differences of actual brightnesses of the reference sub pixels P in the respective division areas and the target brightnesses under the theoretical data signal voltages to compare the differences of the actual brightnesses of the respective division areas and the target brightnesses under the theoretical data signal voltages.

step 4, individually providing a compensation signal voltage to each division area according to the difference of the actual brightnesses and the target brightnesses of the respective division areas of the liquid crystal display panel, and in each division area of the liquid crystal display panel, with the compensation signal voltage, implementing enhancement to a data signal voltage corresponded with a sub pixel, of which a difference of the data signal voltage V+ in a positive polarity driving cycle or the data signal voltage V− in a negative polarity driving cycle and the common voltage VCOM is smaller (which is intuitively demonstrated to be the weak display color), and implementing abatement to a data signal voltage corresponded with a sub pixel, of which a difference of the data signal voltage V+ in the positive polarity driving cycle or the data signal voltage V− in the negative polarity driving cycle and the common voltage VCOM is larger (which is intuitively demonstrated to be the heavy display color). The nonuniform color and flicker issues of the different areas of the panel due to that the red or blue sub pixels are divided into the main region and the sub region can be solved to make the color of the entire liquid crystal display panel to be uniform as showing the gray scale images.

Figure 8:
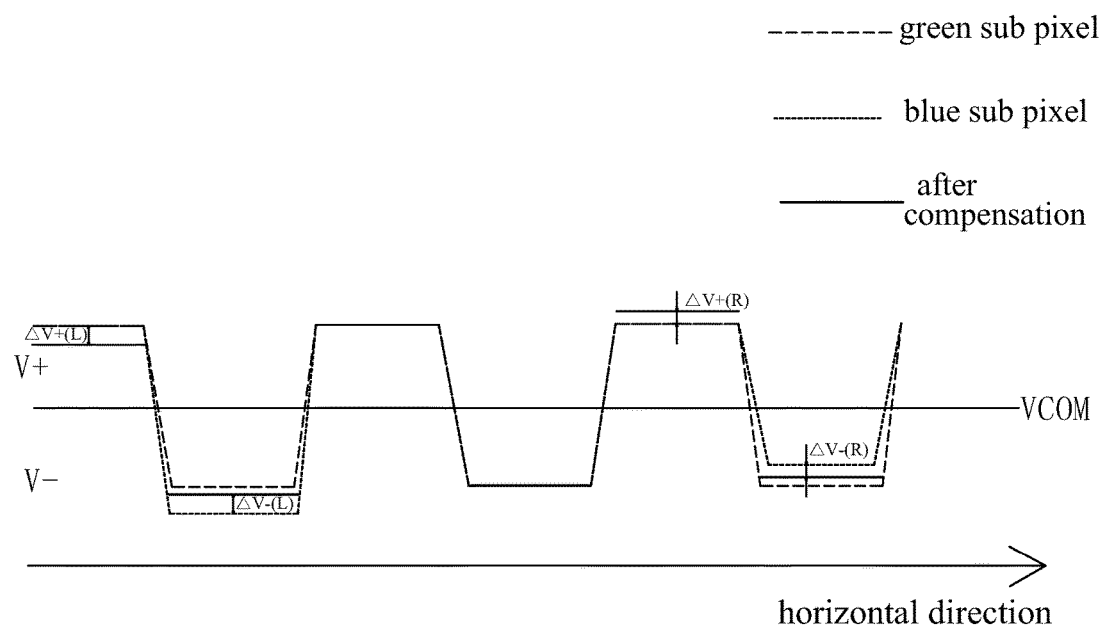
FIG. 8 is a diagram of providing the compensation signal voltage to various division areas of the liquid crystal display panel as regarding the illustration of FIG. 4 in the driving method of the liquid crystal display panel according to the present invention.

The pixel unit structure shown in FIG. 4 is illustrated, in which only the blue sub pixel unit 3 is divided into the two parts, the main region 31 and the sub region 32, and both the green sub pixel unit 2 and the red sub pixel unit 1 are integrated structures, the condition that the compensation signal voltages are provided to the liquid crystal display panel which is divided into the left, the middle and the right various division areas is shown in FIG. 8. The V+ represents the data signal voltage in the positive polarity driving cycle, and the V− represents the data signal voltage in the negative polarity driving cycle, and the common voltage VCOM of different areas are the same values. The fine dotted line represents the actual data signal voltage of the green sub pixel, and the thick dotted line represents the actual data signal voltage of the blue sub pixel, and the ΔV+(L), ΔV−(L) respectively represent the compensation signal voltages of the left division area of the liquid crystal display panel in the positive polarity driving cycle and the negative polarity driving cycle, and the ΔV+(R), ΔV−(R) respectively represent the compensation signal voltages of the right division area of the liquid crystal display panel in the positive polarity driving cycle and the negative polarity driving cycle, and the thick full line represent the data signal voltage after being compensated with the compensation signal voltage. Corresponding to the actual data signal voltages of the blue sub pixels of the left division area, the right division area of the liquid crystal display panel, the common voltage VCOM deviates farer from the central position, and the deviation directions are opposite. The difference of the data signal voltage V+ in a positive polarity driving cycle or the data signal voltage V− in a negative polarity driving cycle and the common voltage VCOM in the blue sub pixel of the left division area is larger, and the difference of the data signal voltage V+ in a positive polarity driving cycle or the data signal voltage V− in a negative polarity driving cycle and the common voltage VCOM in the blue sub pixel of the right division area is smaller. Consequently, it results in that the color deviation happens for the blue sub pixels in the left division area, right division area of the panel, and the bad conditions of blue deviation in the left, the green deviation in the right and the more obvious flicker happen. By providing the compensation signal voltages ΔV+(L), ΔV−(L) to the left division area of the liquid crystal display panel to implement abatement to a data signal voltage corresponded with the blue sub pixel, and by providing the compensation signal voltages ΔV+(R), ΔV−(R) to the right division area of the liquid crystal display panel to implement enhancement to a data signal voltage corresponded with the blue sub pixel, the difference of the actual data signal voltage and the theoretical data signal voltage can be decreased to prevent the bad conditions of blue deviation in the left, the green deviation in the right and the more obvious flicker. Significantly, the directions of ΔV−(L) and ΔV−(R) are opposite, and the signs are opposite. The directions of ΔV− (L) and ΔV− (R) are opposite, and the signs are opposite.

In conclusion, in the driving method of the liquid crystal display panel according to the present invention, area division is implemented to the liquid crystal display panel to obtain at least three division areas for individually providing a compensation signal voltage to each division area according to the difference of the actual brightnesses and the target brightnesses of the respective division areas of the liquid crystal display panel, and in each division area of the liquid crystal display panel, with the compensation signal voltage, implementing enhancement to a data signal voltage corresponded with a sub pixel, of which a difference of the data signal voltage in a positive polarity driving cycle or the data signal voltage in a negative polarity driving cycle and the common voltage is smaller, and implementing abatement to a data signal voltage corresponded with a sub pixel, of which a difference of the data signal voltage in the positive polarity driving cycle or the data signal voltage in the negative polarity driving cycle and the common voltage is larger. The nonuniform color and flicker issues of the different areas of the panel due to that the red or blue sub pixels are divided into the main region and the sub region can be solved to make the color of the entire liquid crystal display panel to be uniform as showing the gray scale images.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:
1. A driving method of a liquid crystal display panel, comprising steps of:
   step 1, providing a liquid crystal display panel;

the liquid crystal display panel comprises a plurality of pixel units aligned in array, and each pixel unit comprises a red sub pixel unit, a green sub pixel unit and a blue sub pixel unit;

the green sub pixel is an integrated structure, and at least one of the red sub pixel unit and the blue sub pixel unit is divided into two parts, a main region and a sub region;

step 2, implementing area division to the liquid crystal display panel to obtain at least three division areas;

step 3, activating the liquid crystal display panel to provide theoretical data signal voltages and the same common voltage to the respective division areas of the liquid crystal display panel to compare differences of actual brightnesses of the respective division areas and target brightnesses under the theoretical data signal voltages;

step 4, individually providing a compensation signal voltage to each division area according to the difference of the actual brightnesses and the target brightnesses of the respective division areas of the liquid crystal display panel, and in each division area of the liquid crystal display panel, with the compensation signal voltage, implementing enhancement to a data signal voltage corresponded with a sub pixel, of which a difference of the data signal voltage in a positive polarity driving cycle or the data signal voltage in a negative polarity driving cycle and the common voltage is smaller, and implementing abatement to a data signal voltage corresponded with a sub pixel, of which a difference of the data signal voltage in the positive polarity driving cycle or the data signal voltage in the negative polarity driving cycle and the common voltage is larger.

2. The driving method of the liquid crystal display panel according to claim 1, wherein in the step 1, only the blue sub pixel unit is divided into the two parts, the main region and the sub region.

3. The driving method of the liquid crystal display panel according to claim 1, wherein in the step 1, only the red sub pixel unit is divided into the two parts, the main region and the sub region.

4. The driving method of the liquid crystal display panel according to claim 1, wherein in the step 1, the blue sub pixel unit is divided into the two parts, the main region and the sub region, and the red sub pixel unit is also divided into the two parts, the main region and the sub region.

5. The driving method of the liquid crystal display panel according to claim 1, wherein in the step 2, according to a position corresponded with a source drive IC in the liquid crystal display panel, the area division is implemented to the liquid crystal display panel to obtain at least three division areas.

6. The driving method of the liquid crystal display panel according to claim 1, wherein in the step 2, the area division is implemented to the liquid crystal display panel along a horizontal direction to obtain at least three division areas.

7. The driving method of the liquid crystal display panel according to claim 6, wherein the step 2 further comprises separately selecting one reference sub pixel in each division area, and in the step 3, comparing differences of actual brightnesses of the reference sub pixels in the respective division areas and the target brightnesses under the theoretical data signal voltages to compare the differences of the actual brightnesses of the respective division areas and the target brightnesses under the theoretical data signal voltages.

8. The driving method of the liquid crystal display panel according to claim 7, wherein a distance a between the reference sub pixel and a left frame or a right frame of the liquid crystal display panel is: $0.1 \times L < a < 0.4 \times L$, and L is a width of the liquid crystal display panel; a distance b between the reference sub pixel and a top frame or a bottom frame of the liquid crystal display panel is: $0.2 \times H < b < 0.7 \times H$, and H is a height of the liquid crystal display panel.

9. The driving method of the liquid crystal display panel according to claim 1, wherein the sub pixel of the integrated structure comprises an integrated pixel electrode of a pozidriv structure; in the sub pixel divided with the two parts, the main region and the sub region, wherein the main region comprises a main region pixel electrode of a pozidriv structure, and the sub region comprises a sub region pixel electrode of a pozidriv structure.

10. A driving method of a liquid crystal display panel, comprising steps of:

step 1, providing a liquid crystal display panel;

the liquid crystal display panel comprises a plurality of pixel units aligned in array, and each pixel unit comprises a red sub pixel unit, a green sub pixel unit and a blue sub pixel unit;

the green sub pixel is an integrated structure, and at least one of the red sub pixel unit and the blue sub pixel unit is divided into two parts, a main region and a sub region;

step 2, implementing area division to the liquid crystal display panel to obtain at least three division areas;

step 3, activating the liquid crystal display panel to provide theoretical data signal voltages and the same common voltage to the respective division areas of the liquid crystal display panel to compare differences of actual brightnesses of the respective division areas and target brightnesses under the theoretical data signal voltages;

step 4, individually providing a compensation signal voltage to each division area according to the difference of the actual brightnesses and the target brightnesses of the respective division areas of the liquid crystal display panel, and in each division area of the liquid crystal display panel, with the compensation signal voltage, implementing enhancement to a data signal voltage corresponded with a sub pixel, of which a difference of the data signal voltage in a positive polarity driving cycle or the data signal voltage in a negative polarity driving cycle and the common voltage is smaller, and implementing abatement to a data signal voltage corresponded with a sub pixel, of which a difference of the data signal voltage in the positive polarity driving cycle or the data signal voltage in the negative polarity driving cycle and the common voltage is larger;

wherein in the step 1, only the blue sub pixel unit is divided into the two parts, the main region and the sub region;

wherein in the step 2, the area division is implemented to the liquid crystal display panel along a horizontal direction to obtain at least three division areas;

wherein the sub pixel of the integrated structure comprises an integrated pixel electrode of a pozidriv structure; in the sub pixel divided with the two parts, the main region and the sub region, wherein the main region comprises a main region pixel electrode of a pozidriv structure, and the sub region comprises a sub region pixel electrode of a pozidriv structure.

11. The driving method of the liquid crystal display panel according to claim 10, wherein the step 2 further comprises separately selecting one reference sub pixel in each division area, and in the step 3, comparing differences of actual brightnesses of the reference sub pixels in the respective division areas and the target brightnesses under the theoretical data signal voltages to compare the differences of the actual brightnesses of the respective division areas and the target brightnesses under the theoretical data signal voltages.

12. The driving method of the liquid crystal display panel according to claim 11, wherein a distance a between the reference sub pixel and a left frame or a right frame of the liquid crystal display panel is: $0.1 \times L < a < 0.4 \times L$, and L is a width of the liquid crystal display panel; a distance b between the reference sub pixel and a top frame or a bottom frame of the liquid crystal display panel is: $0.2 \times H < b < 0.7 \times H$, and H is a height of the liquid crystal display panel.

\* \* \* \* \*